Dec. 23, 1941.  R. MOSSDORF  2,267,250
PRODUCTION OF CROSS-SECTION PROFILES BOUNDED BY CYCLOIDAL CURVES
Filed March 22, 1939  8 Sheets-Sheet 1

Inventor:
R. Mossdorf
by Hascock Downing & Seebold
Attys.

Inventor:
R. Mossdorf

Dec. 23, 1941.  R. MOSSDORF  2,267,250
PRODUCTION OF CROSS-SECTION PROFILES BOUNDED BY CYCLOIDAL CURVES
Filed March 22, 1939  8 Sheets-Sheet 3

Inventor:
R. Mossdorf
by Glascock Downing & Seebold
Attys.

Dec. 23, 1941.   R. MOSSDORF   2,267,250
PRODUCTION OF CROSS-SECTION PROFILES BOUNDED BY CYCLOIDAL CURVES
Filed March 22, 1939   8 Sheets-Sheet 4

Inventor:
R. Mossdorf
By: Glascock Downing Seebold
Attys.

Dec. 23, 1941.   R. MOSSDORF   2,267,250
PRODUCTION OF CROSS-SECTION PROFILES BOUNDED BY CYCLOIDAL CURVES
Filed March 22, 1939   8 Sheets—Sheet 6

Inventor:
R. Mossdorf
by Glascock Downing & Seebold

Dec. 23, 1941.  R. MOSSDORF  2,267,250
PRODUCTION OF CROSS-SECTION PROFILES BOUNDED BY CYCLOIDAL CURVES
Filed March 22, 1939  8 Sheets-Sheet 7

Fig. 10

Inventor:
R. Mossdorf
by Glascock Downing Seebold
Attys.

Dec. 23, 1941.  R. MOSSDORF  2,267,250
PRODUCTION OF CROSS-SECTION PROFILES BOUNDED BY CYCLOIDAL CURVES
Filed March 22, 1939   8 Sheets-Sheet 8

Inventor:
R. Mossdorf
By: Glascock Downing & Seebold

Patented Dec. 23, 1941

2,267,250

UNITED STATES PATENT OFFICE 2,267,250

PRODUCTION OF CROSS-SECTION PROFILES BOUNDED BY CYCLOIDAL CURVES

Richard Mossdorf, Vienna, Germany, assignor to Ernst Krause & Co., A. G., Vienna, Germany Application March 22, 1939, Serial No. 263,511
In Germany March 25, 1938

8 Claims. (Cl. 51—95)

As is well known, cycloidal curves are produced by rolling a rolling circle on or in a stationary base circle, the point producing the curve performing at a certain distance from the centre of the rolling circle in the angular velocity of the rolling circle. The line normal to the curve passes at any moment through the tracing point and through the touching point of the two rolling circles.

A method derived from these kinetic relations for the production of cycloidal curve profiles has the disadvantage however that the motions due to the rolling of the rolling circles or of the gears replacing them have their rotary centre in the centre of the rolling circle, whilst the centre of the curve to be produced must coincide with the centre of the base circle, for which reason special auxiliary means are required for transmitting the motions obtained in the centre of the rolling circle without change to the centre of the base circle. These auxiliary means do not however ensure a transmission of the motions, which is entirely free from play, and moreover are subject to a high internal friction, with the result that, more particularly after wear has taken place, the curve to be produced will be faulty.

According to the present invention a method is used for the production of cross section profiles bounded by cycloidal curves, in which the described disadvantage is entirely eliminated, as the motions to be imparted to the blank are produced directly in the centre of the curve.

Cycloidal curves can also be produced through the sides of a link parallelogram performing rotary motions about a common corner point, the angular velocities and directions of rotation of which bear a certain transmission ratio to one another, the corner point of the parallelogram, which is diagonally opposite the rotary centre, describing a cycloidal curve. According to whether the directions of rotation of the sides are equidirectional or oppositely directed, cycloidal curves of different shape will result.

When the angular velocities of the sides bear an integral relation to one another (such for instance as 1:3 or 3:1), curved annular lines are produced, the periodicity of which is determined by the magnitude and direction of the angles of rotation referred to one parallelogram side. The lengths of the parallelogram sides correspond to half the sum and to half the difference of the greatest and smallest curve radius, and the line normal to the curve will at any moment pass through the generating corner point of the parallelogram in such a manner that it will cut off on the parallelogram sides or their extensions distances which are related to one another as the periodicity.

The invention is illustrated by way of example in the accompanying drawings, in which.

Figure 1A:
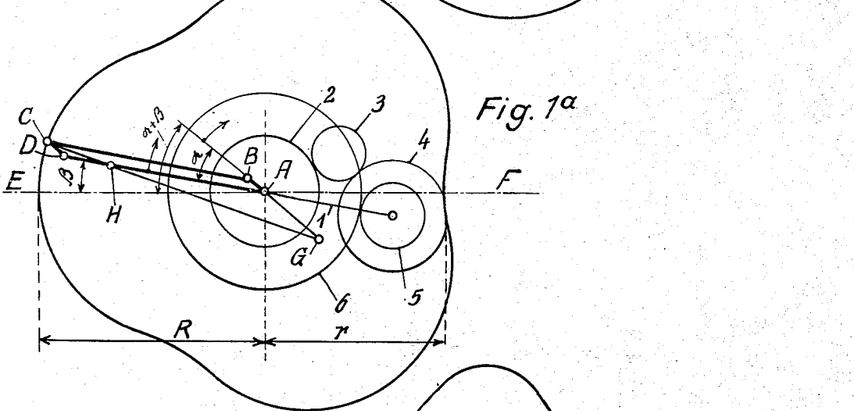
Figures 1a and 1b are diagrams depicting the production of a cycloidal curve, the link parallelogram of the diagrams being in two different positions with respect to a stationary curve.

In Figure 1a a curve is shown, which is closed on itself and the shape of which shows a course which is for instance repeated three times. This curve is produced through the motion of the link parallelogram A—B—C—D, having its corner point A coinciding with the centre of the curve and its side $A—D=(R+r):2$ and $A—B=(R-r):2$. The sides A—D and A—B turn round the point A as the rotary centre, in this case in the same rotary sense (see the arrows), the side A—B moving at an angular velocity $w_1$ and the side A—D with the angular velocity $w_2$ (see also Figure 1c).

When the curve generating the corner point C of the link parallelogram A—B—C—D, which lies diagonally opposite the rotary centre A, passes through the culminating points of the curve, that is to say through those points which lie furthest out and furthest in (in the present case there are 3 such points each), all the sides of the parallelogram will each time come into a straight line (for instance into the line E—F), such that the distance of an outer culminating point from the rotary centre A corresponds to the sum of the two parallelogram sides $(A—D+A—B)$, while the distance of an inner culminating point from the rotary centre A is equal to the difference of the two parallelogram sides (that is, $A—D—A—$).

In the example under consideration the angular velocities $w_1:w_2$ are as 4:1. When, therefore, the parallelogram side A—D has turned with respect to the centre line E—A—F through the angle $\beta$, the parallelogram side A—B will in the same time have turned through the angle $\alpha+\beta=4\beta$; the angle $\alpha$, that is to say the amount by which the parallelogram side A—B has turned with respect to the parallelogram side A—D in the same unit of time, amounts therefore to $3\beta$.

Resolving the motion of the point C into the separate tangential motions which are imparted to it by the parallelogram sides (Figure 1a), the velocities $v_1$ and $v_2$ are obtained, which give the resultant velocity $v_3$ of the point C, the direction of which at the same time represents the tangent to the curve in the point C. The perpendicular to this tangent intersects the parallelogram sides in the points H and G and is normal to the curve. As however the straight lines C—L and C—N are perpendicular to the associated sides B—C and C—D, the triangles C—L—M, C—D—H and A—H—G are similar to one another. From this it will be seen that the relations are equal between the triangle sides:

L—M : C—D : A—G
C—L : D—H : A—H and
C—M : C—H : H—G

The magnitude of the velocities $v_1$ and $v_2$ is however equal to the product of the parallelogram sides and their angular velocities, so that $C—L = A—D \times w_2$ and
$L—M = A—B \times w_1 = C—D \times 4w_2$ D—H is obtained from the relations $L—M : C—D = C—L : D—H$ so that $D—H = (C—L \times C—D) : L—M = (A—D \times w_2) \times C—D : 4 \times w_2 \times C—D = 1/4\ A—D;$ consequently $D—H : A—H = 1 : 3$ From the similarity of the triangles C—D—H and A—H—G are obtained $A—B\ (C—D) : A—G = D—H : A—H = 1 : 3$ As A—B and A—D remain invariable in length during the motion, according to the said relations the lengths A—G, A—H and D—H, which are cut off by the normal to the curve, are also constant during the motion. The lengths C—H and H—G cut off on the normal to the curve are also always in the same ratio $A—B : A—G$ or $D—H : A—H$, but alter their length during the motion. The normal may therefore be regarded as a slotted guide, in which the end points G and H of the cranks A—G and A—H engage, and the position of which is determined by the position at the moment of the two cranks. The generating point C is always on this normal, either at the distance B—C from B or at the distance C—D from D.

Now, if with one of the parallelogram sides circling about the point A, for instance A—D, the connecting link 1 of a transmission gear be connected, the wheel 2 of which is rigidly connected with another parallelogram side (A—B) and which transmits its rotary motion by way of the wheels 3, 4 and 5 in the ratio of transmission 1 : 3 (periodicity) in the opposite direction to the wheel 6, which is rigidly connected to the curve centre E—A—F, then the side A—B will turn with respect to the side A—D through the angle $\alpha$ in one direction and the curve centre E—A—F through the angle $\beta$ in the opposite direction, or, referred to the centre E—A—F, the parallelogram sides will have turned in the same direction, namely A—D through the angle $\beta$ and A—B through the angle $\alpha+\beta$, $\alpha : \beta$ being equal to 3.

Figure 1B:
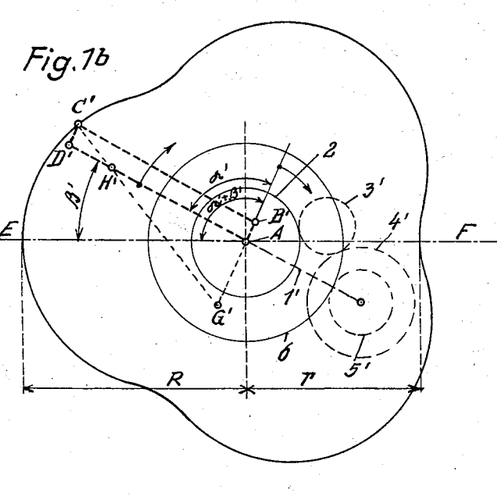
Figure 1C:
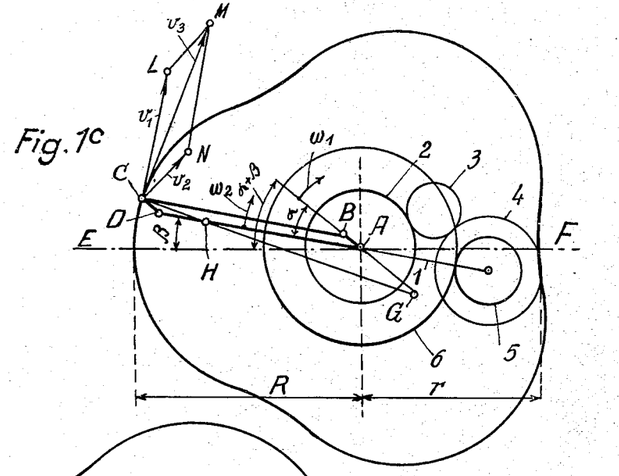
Figure 1c is a diagram corresponding to Figure 1a, but showing additional matter.

As the distance A—H remains constant throughout the motion, as a comparison with Figure 1b which illustrates another position will also show, the connecting link 1 (1') of the gear which is connected to the length A—H (A—H') can always have the direction of the side A—D (A—D') or a position which is constant with respect to it, if it be guided with a lever arm of the length A—H (equal to A—H') in the normal of the curve having the form of a slotted guide. For the rest it is immaterial which part of the gear is assumed as being stationary in space, as the relative motions of the individual parts to one another remain unchanged.

Figure 2A:
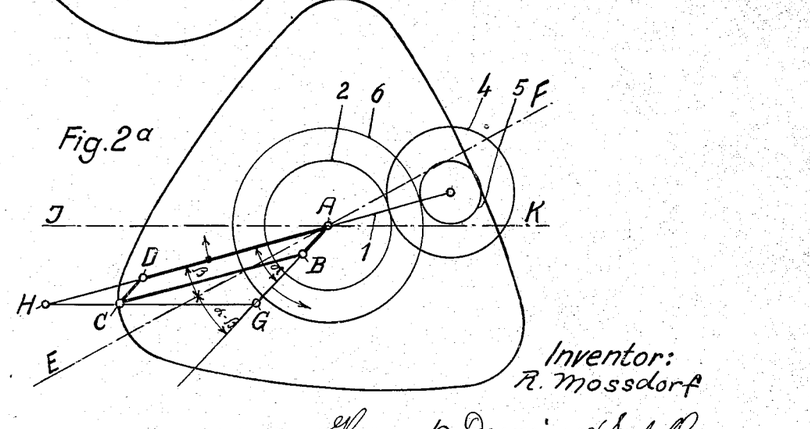
Figures 2a and 2b are also diagrams depicting another form of curve, two positions being again shown, as in Figures 1a and 1b.
Figure 2B:
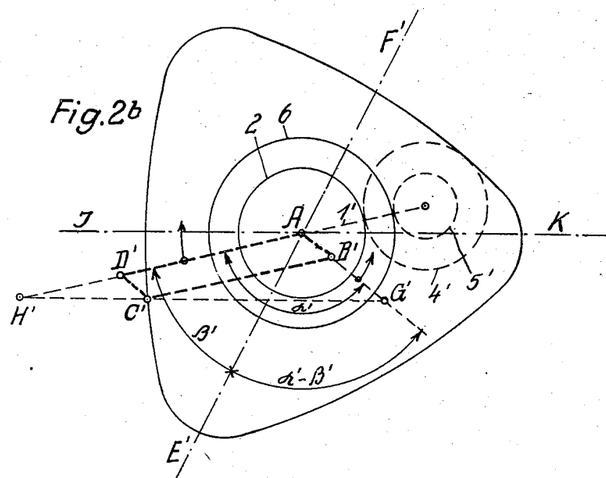

In Figures 2a and 2b a gear is illustrated by way of example, in which the parallelogram sides turn in opposite directions with respect to the centre line E—A—F (E'—A—F'), namely in the ratio $\alpha : \alpha—\beta(\alpha' : \alpha'—\beta')$. With respect to the connecting link 1 (1') of the gear the lines E—A—F (E'—A—F') and A—B (A'—B') thus turn in the same direction in the ratio $\alpha : \beta(\alpha' : \beta') = 3$ (periodicity). For this purpose only the intermediate wheel 3 is omitted, and for the rest what was said with respect to Figures 1a and 1b applies.

The arrangement in Figures 2a and 2b is such that a line I—A—K passing through the centre point A of the curve is assumed to be fixed in space and that the normal to the curve, H—C—G (H'—C'—G') and its extension is guided with the aid of a suitable, hereinafter described arrangement, always parallel to this line I—A—K. On the crank and with it the wheel 2 being turned by a suitable driving device around the fixed point A, the normal to the curve will swing, owing to the parallel guide, to both sides of the line I—A—K, according to the size of A—G (equal to A—G') always parallel to I—A—K, the parallelogram side B—C (B'—C') which is pivoted in the point C (C') determining the position of the curve normal in the direction of the latter, whilst the point G (G') slides along the normal. By the lever A—H (=A—H') which is pivoted in the point A and which with its end point H (H') also slides along the normal the connecting link 1 (1') which is connected to the said lever is always turned in the direction of the parallelogram side A—D (A—D'), so that with respect to the connecting link 1 (1') of the gear the wheel 2 will have turned through the angle $\alpha$ ($\alpha'$), which wheel, owing to the gearing ratio of the wheels, turns the wheel 6 and with it the centre line E—A—F (E'—A—F') through the angle $\beta$ ($\beta'$)

with respect to the connecting link 1 (1') of the gear.

Through this arrangement it becomes unnecessary for the blank to be substituted directly for the curve profile. This arrangement avoids the necessity of the means for holding and the means for driving the tool or the blank taking part in the swinging motions of the gear, in which case considerable masses would have to be each time accelerated or retarded by a certain angular amount and the parts of the gear would be very heavily stressed. The driving speed of the device would in this case have to be kept within low limits.

The position of the gear centre in the stationary rotary centre A makes it readily possible to displace the centre of the blank to any place in space and to transmit the rotary motion of the wheel 6 by means of suitable wheel transmissions to the blank. The tool must then also be displaced in the same way with respect to the normal. The amount and direction of the displacement must correspond exactly to that of the blank centre with respect to the point A and the fresh position occupied by the tool must be invariable with respect to the normal. In this way it thus becomes possible to produce the same curve at a place which is not obstructed by the gear.

Figure 3:
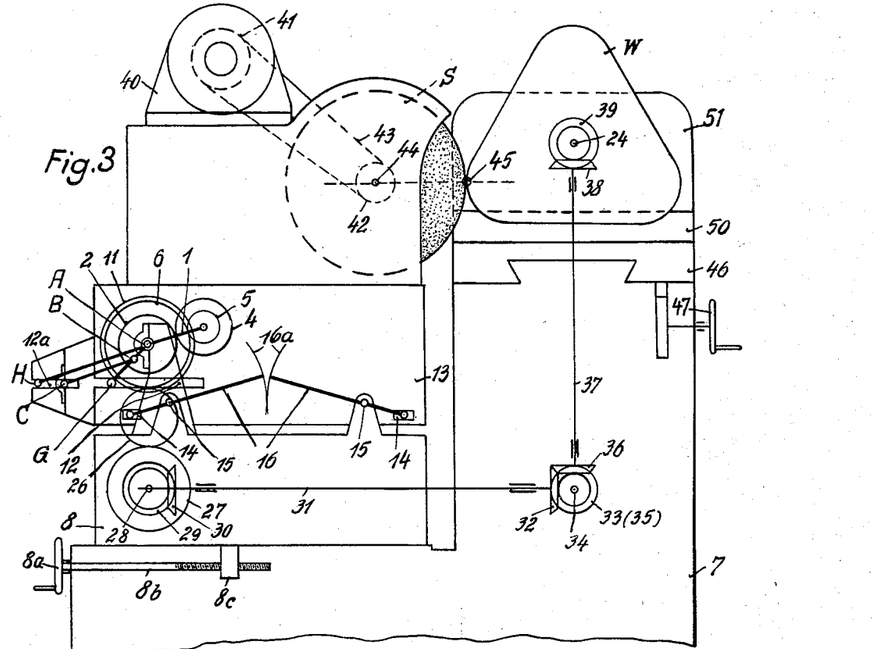
Figure 3 is a diagrammatic side elevation of a machine according to the invention.
Figure 4:
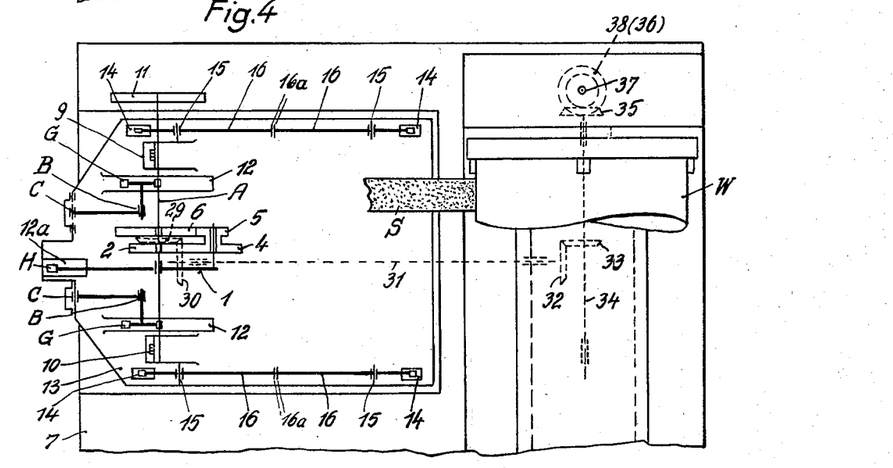
Figure 4 is a plan view of the structure shown in Figure 3.

The diagrammatic embodiment of this idea is shown in Figs. 3 and 4. On the fixed machine bed 7 the slide or carriage 8 is arranged so as to be displaced perpendicularly to the axis 24 of the blank or work piece W, Fig. 3. The displacement of the slide 8, for instance by means of the hand wheel 8a, the spindle 8b of which is guided in the nut 8c, only serves the purpose of adjustment and may equally well be effected from some other means. On this slide 8, a rotary shaft A is mounted. In the plan view (Fig. 4) the shaft is shown journalled in the bearings 9 and 10 of the slide 8 and is turned by the wheel 11 driven by a motor (not shown). To the shaft A, two cranks A—G are rigidly connected to and at the points B the two links B—C are pivoted. The distances A—B and B—C thus correspond to the parallelogram sides according to the Figs. 2a and 2b. The shaft A rotates in a bearing in the lever A—H which has a connecting link 1 of the gear rigidly fixed to it. The wheel 2 which is fixed to the shaft A drives (by means of the intermediate wheels 4 and 5) the wheel 6 which is loose on the shaft A. The end pins G—H of the cranks A—G and A—H slide in the slots 12 and 12a of the bearing body or tool support 13 which is movable relatively to the crank 8. The links B—C are pivotally connected at C with a fixed part of the bearing body 13. The bearing body 13, which carries the grinding wheel S, thus receives a guided movement which is dependent on the size of the cranks A—G.

For this purpose there are provided in the bearing body 13, two pairs of slotted guides 14, in which engage the outer ends of levers 16 which rock on the bearings 15 mounted on the slide 8 and are positively connected with one another by the toothed segments 16a. By this means a motion initiated at any place of the bearing body 13 is transmitted to the same extent to all the slotted guides 14, that is to say the bearing body 13 and consequently also the slots 12 and 12a representing the normal to the curve are always guided in a parallel manner, the amount of the parallel motion being influenced only by the size of the cranks A—G of the shaft A.

The parallel guide arrangement described above enables the tool S to be displayed in unison with the bearing body 13 in such a manner that the new position corresponds to the previously described displacement of the centre of the work. If (see Fig. 3) the centre of the work W be brought to the point 24 and be there supported in the work carrier 51, it will thus always occupy an invariable position with respect to the axis of the shaft A. By way of the spur wheels 26 and 27 (driven by pinion 6), the bevel wheel 29 which is rigidly connected to the wheel 27 and runs loosely on the journal 28 (supported by carriage 8), the bevel wheel 30, the shaft 31, the bevel wheels 32 and 33, the shaft 34 (journalled in bed 7), the bevel wheels 35 and 36, the shaft 37 and the bevel wheels 38 and 39, the rotary motion of the spur wheel 6 can be transmitted unchanged as regards amount and direction to the work W which now has its centre of rotation at 24. The tool, namely the grinding disc S, which may be driven from a motor 40 by means of the belt pulleys 41 and 42 and the belt 43, must now be so arranged on the bearing body 13 that its axis 44 lies in a plane which passes through the line of contact 45 of the tool S with the work W and is parallel to the guide slots 12a or 12, representing the curve normal H—C—G (Fig. 2a). The axes A and 24 are fixed in place (apart from the displacement required for an adjusting motion by 8a). The points C and 45 take part in the movements of the bearing body 13, while the distance C—45 is always equal to the distance A—24 and the corresponding lengths are always parallel to one another. Consequently the same curve is produced at the point 45 as at the point C.

The grinding disc S may of course be replaced by any other tool, for instance a cutting tool. This tool must then be so arranged that its cutting edge will lie at the point 45, where it will also produce a curve which is identical with that produced at the point C. Owing to the invariable position of the tool with respect to the curve normal, the cutting angles will also always remain constant.

By making the bearings 9, 10 and C, C sectional, it is possible to remove the parts of the gear arranged about the shaft A form their bearings in a simple manner and from the guide slots 12 and 12a, the ends of which may be left open, and to replace them by another unit for producing the new curve without it being necessary to make any other alterations in the device itself.

Figure 5:
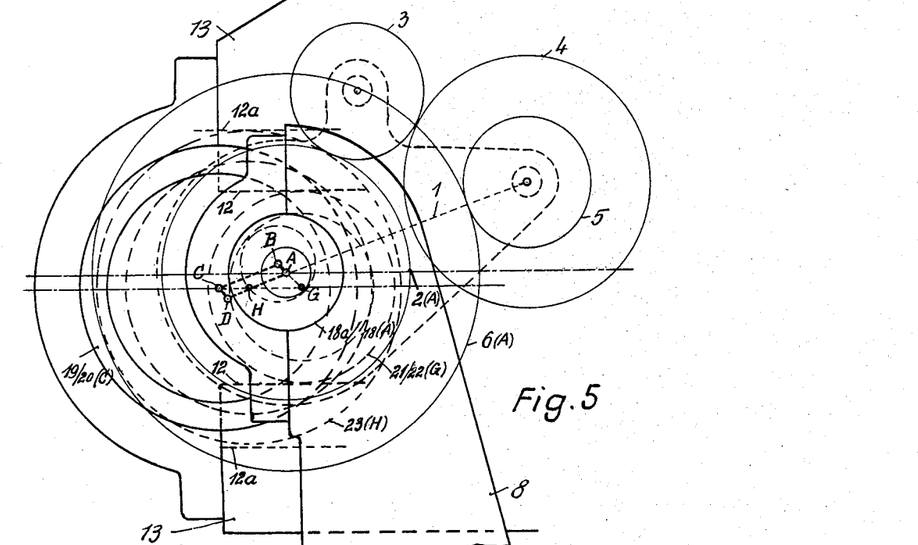
Figure 5 a gear detail in side elevation, which determines the shape and size of the curve.
Figure 6:
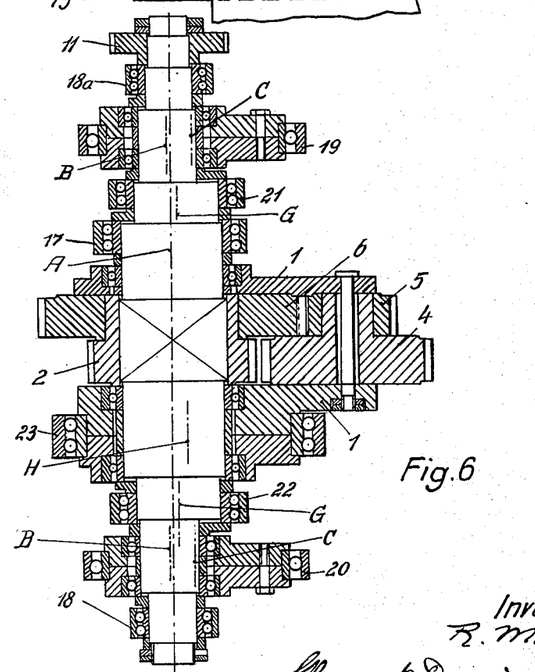
Figure 6 is a similar gear unit in longitudinal section.

In Fig. 5 such a gear unit is shown in side elevation and in Fig. 6 in longitudinal section. The shaft A extending right through it, is mounted in the bearings 17, 18 and 18a, which are rigidly mounted on the carriage part 8 of the device, and is driven by the wheel 11. The parallelogram sides or cranks, previously referred to, which would in most cases be very small are in Figs. 5 and 6 replaced by eccentrics. The eccentrics A—B correspond to one parallelogram side, while the other parallelogram side is provided by the eccentrics B—C, the centres (axes) C being held by the embracing bearings 19 and 20 in the movable part or tool carrier 13 of the device. The eccentrics A—G represent the size of crank corresponding to Figs. 1a to 2b and the embracing bearings 21 and 22 roll in the slots 12 of the bearing body 13. The crank length A—H is connected to the connecting link 1 of the gear and with the bearing 23, which is concentric with H, and moves in the slot 12a of the bearing body 13, always parallel to the parallelogram side B—C. On the shaft A is fixed the gear wheel 2 which drives by way of the intermediate gear wheels 3, 4 and 5 (Fig. 5) or 4 and 5 (Fig. 6), the wheel 6 which runs loosely on A. All the elements which determine the shape of the curve thus form a single unit.

Figure 7:
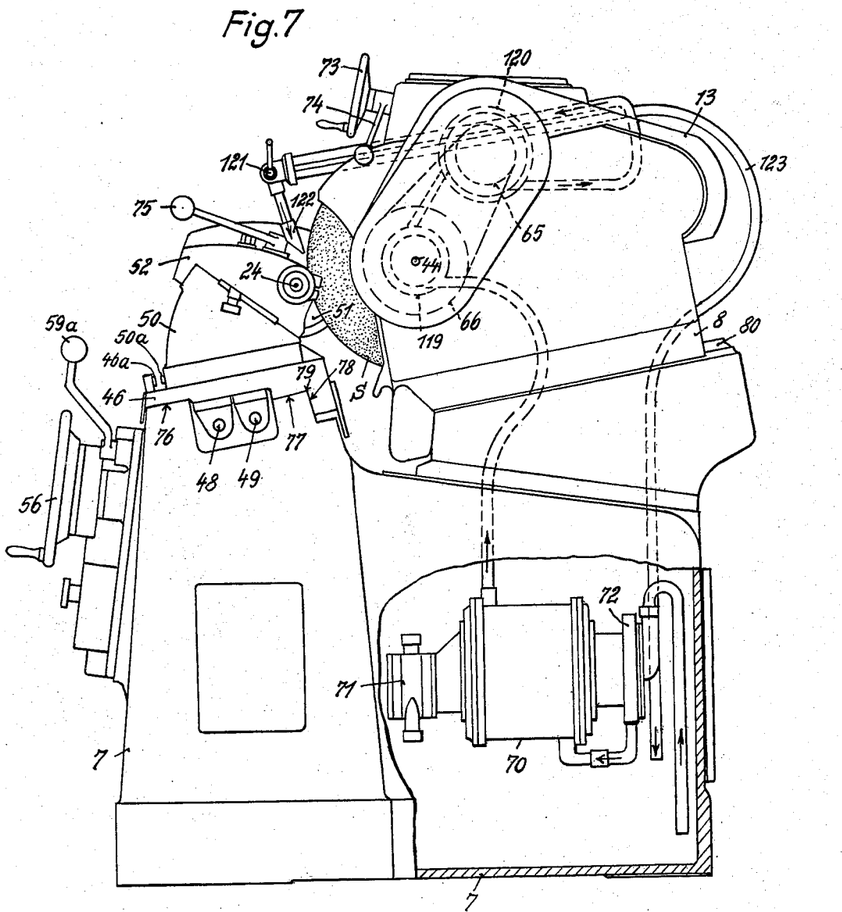
Figure 7 is a machine according to the invention in side elevation, partly in section.

A machine according to the invention is illustrated by way of example in a constructional form in Fig. 7 in side elevation. The machine includes a bed or frame 7, on which the lower part 46 of the table can be displaced in the direction of the axis 24 of the work. This displacement is effected either by hand with the aid of a hand wheel 47 (Fig. 3) or automatically by means of a hydraulic gear which acts on the two pistons 48 and 49.

On the lower part 46 of the table is arranged the upper part 50 of the table, so as to be capable of swivelling on it. By this means the axis 24 of the work can be set either parallel or at an inclination to the direction of motion of the table, so that it is possible to produce work of cylindrical or conical form. On the upper part 50 of the table the work carrier 51 is fixed, while the sliding puppet or clamping member 52 is capable of being displaced on the upper part 50 of the table in the longitudinal direction, for enabling it to be adjusted in accordance with the length of the workpieces to be operated on. The workpieces are fixed and released by using the lever 75.

For external grinding the work spindle support 51 is provided with the fixed centre 53 (Fig. 9a) and the driver disc 54, by means of which the work W (Figs. 3 and 4) is driven. For internal grinding the driver disc 54 is replaced by the chuck 55 (Fig. 9b), and the sliding puppet 52 in this case is not used. To permit turning the work for the purpose of adjusting it for clamping, the hand wheel 73 is used, which can be coupled or uncoupled with the wheel 11 (Figs. 3 and 4), according to requirement, by the lever 74.

Figures 8, 9, 9A, 9B:
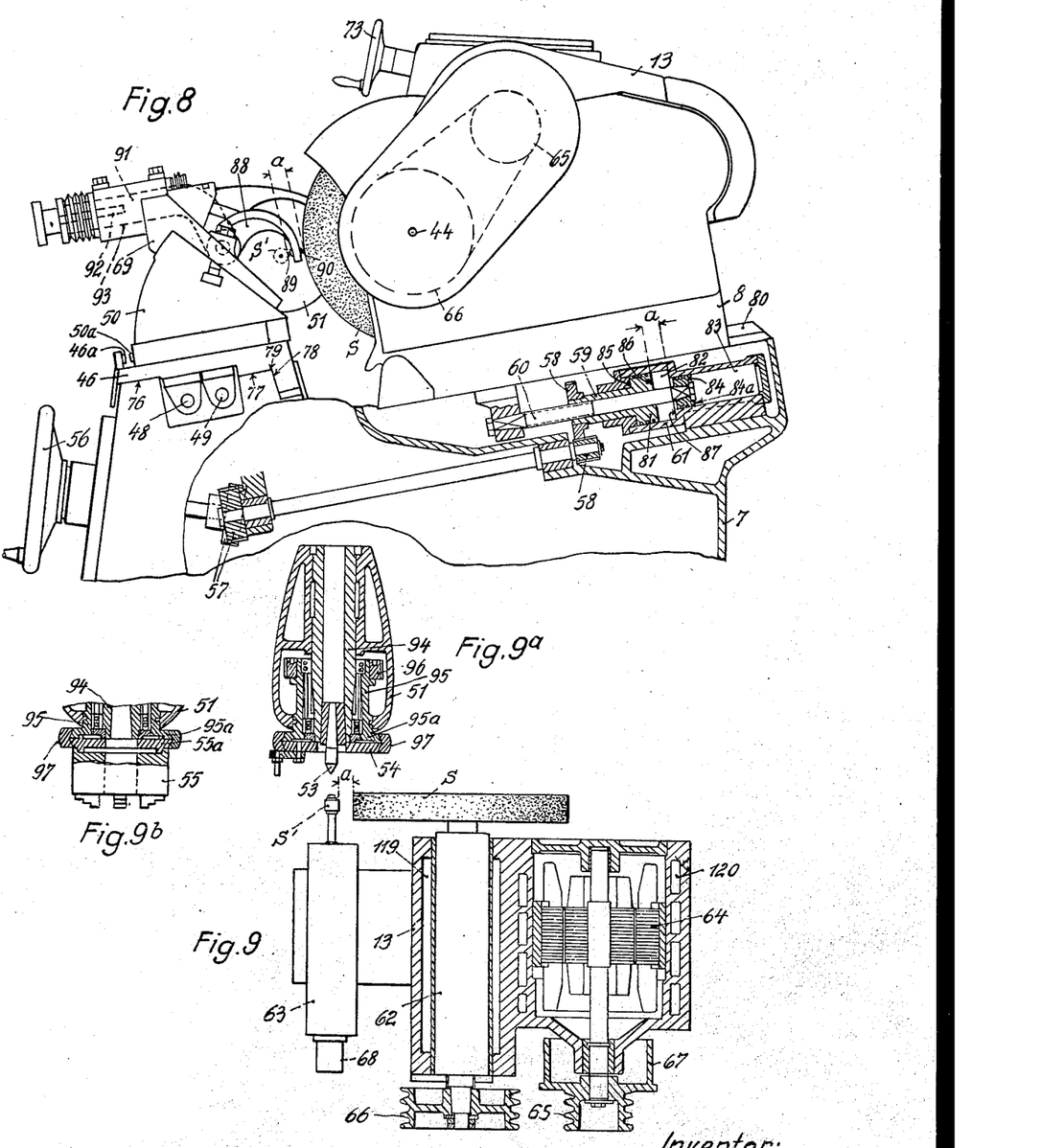
Figure 8 shows the upper part of the machine according to Figure 7 on an enlarged scale, also partially in section.
Figure 9 shows the tool carrier with the driving motor, in section.
Figure 9a shows the work holder (in section) for external grinding.
Figure 9b the work holder (in section) for internal grinding.

For the support and adjustment of the tool (grinding disc S) the slide 8 is used, which in the construction shown in Fig. 8 is adjusted by means of a hand wheel 56 (corresponding to 8a in Fig. 3), by means of pairs of gear wheels 57 and 58 and the nut 59; the latter having threaded engagement with a screw 60 rigidly connected to the slide 8. Furthermore, the nut 59 which is in the form of a piston 81 can be rapidly displaced by oil pressure exerted in a cylinder 61. The application of the pressure can be controlled by a lever 59a (Fig. 7).

On the slide 8 is movable arranged the tool carrier 13 which in a manner hereinafter described performs the motions required for producing the profiles. For external grinding, the tool carrier 13 serves for the reception of the grinding spindle 62 with the external grinding disc S (Fig. 9), and for internal grinding the internal grinding spindle 63 with the internal grinding disc S' is fixed on the carrier 13, after the removal of the external grinding disc S. Both grinding spindles are driven by the built-in motor 64, the external grinding disc S by means of a V-shaped belt by way of the belt pulleys 65 and 66 and the internal grinding disc S' by a belt by way of the smooth belt pulleys 67 and 68.

The motor 70 (Fig. 7) drives the oil pressure pump 71 which delivers the oil with constant pressure and in constant quantities to a hydraulic gear (not shown) for producing the various motions. The same motor 70 also serves as the means for driving a water pump 72 which produces a water circulation to be used for cooling the motors 70 (Fig. 7) and 64 (Fig. 9) and the workpieces W (Figs. 3 and 4).

The guides 76 and 77 (Figs. 7 and 8) which serve as supports for the lower part 46 of the workpiece supporting table are parallel to one another, but are inclined to the horizontal in such a way that the table 46, 50 always seeks to slide downwards on these guides and to bear against a further guide 78 which is so arranged that the lateral forces produced by the weight of the whole table and by the grinding pressure is reliably taken up by the guides 76, 77, 78.

In contradistinction to the table guiding means hitherto known, which are dependent on the weight of the table, the arrangement of the table guiding means, here illustrated, has the advantage, that it requires only two directions in space of the sliding surfaces. This is brought about through the guides 76 and 77, which may have a definite distance from one another, always being parallel to one another, so that it is also possible to ensure the accurate position of these two guides with respect to one another. The line of intersection 79 of the surfaces 77 and 78 provides the decisive longitudinal direction for the guiding of the table. In the table guiding arrangements for grinding machines, as hitherto known, three different directions in space have always been used, so that there is the difficulty of bringing the line of inclination of two surfaces into a position which is exactly parallel to the third surface.

The guides 80 for the slide 8 are also inclined to the horizontal, so that the slide 8 carrying the tool (grinding disc S) always seeks to slide towards the work being operated on, with the further result, that the tool will always occupy a definite position with respect to the work.

When grinding externally, it is of advantage, after the end of the operation, to shift the slide 8 of the grinding spindle support 13 to a certain extent away from the work, so as to make the latter easily accessible for measuring and for removal. This is effected by the adjustment nut 59 as shown in Fig. 8.

In order to ensure, however, that back lash in the threads is entirely eliminated, the piston drive is given a differential action, such that the cylinder 61, besides having the bore 82 for the reception of the piston 81, is provided with a further smaller bore 83, in which the end of the threaded spindle 60 in the form of a piston 84 slides. The end surface 84a of the piston 84 is always under oil pressure, so that the thread convolutions of the threaded spindle 60 are always forced in the same direction against the thread convolutions of the nut 59. The forward stroke of the piston 81 is limited by the end surface 85 of the piston 81 bearing against the surface of the cylinder cover. When the nut 59 and with it the slide 8 is to be moved back, the surface 85 of the piston 81 is brought under oil pressure which, owing to this surface being greater, overcomes the oil pressure behind the piston 84 and displaces the pistons 81 and 84 in the rearward direction, the back lash of the thread always being compensated in the same direction. The path of displacement is limited rearwardly by the surface 86 of the piston 81 striking against the shoulder 87 of the cylinder 61. This, in connection with the always equally directed elimination of back lash, has the effect, that the slide 8 is always displaced by an exactly limited amount a (Fig. 8).

The trueing device 69 (Fig. 8) which is adapted to be placed on the upper part 50 of the table, serves the purpose of trueing up both the external and internal grinding discs.

The trueing up of grinding discs which are to be used over their entire width for finish grinding surfaces requires great care and great accuracy. In general, for instance in round grinding machines, the trueing diamond is so arranged that it can be brought up to any accessible point on the grinding disc, so that, when the table is longitudinally displaced, the diamond will produce on the grinding disc a surface-defining line which at the point of contact of the diamond extends parallel to the table guide. Now, should the grinding spindle not be exactly parallel with respect to the guiding means of the table, the surface-defining lines produced by the diamond will also not be parallel to the axis of the grinding disc, that is to say the diamond will produce on the grinding disc not a true cylinder, but a hyperboloid which then cannot make contact with the work along a straight line, as the position of the work with respect to the grinding disc will be different from that of the diamond.

This disadvantage is overcome, by the diamond being traversed past the grinding disc at the place which will later during grinding come in contact with the work. In the case of external grinding machines such an arrangement is not possible, without removing the work, when trueing up. When the grinding machine is used both for external and internal grinding, the disadvantage referred to, when the same trueing device is used, will occur at the internal grinding disc to a still greater extent, as the internal grinding disc always has a far smaller diameter. More particularly when grinding according to the "incising method" an accurate agreement of external and internal profile would not be obtainable, as the effect of the deviations will be opposite at the two grinding discs.

The adjustability of the slide 8 by the amount a, (Fig. 8), is utilised for the purpose of obtaining for the trueing up of the grinding discs (S and S') two accurately limited positions which lie apart from one another by the aforesaid amount a. The forward position is used for trueing up the internal grinding disc S' and the rearward position for trueing up the external grinding disc S. The trueing device 69, previously referred to, is provided for this purpose with a rockable arm 88, at the end of which are mounted the two diamonds 89 and 90, the points of which lie apart from one another by the same amount a of the path travelled by the piston (Figure 8). The effect of this arrangement is that the point of the diamond 89 will true up on the internal grinding disc S' a surface-defining line, in which during the grinding operation the work and the tool will come in contact with one another, and the point of the diamond 90 in the same way trues up on the external grinding disc S a surface-defining line which in external grinding corresponds to the generating contact line (see 45 in Figure 3). Owing to the circumstance, however, that after trueing up the external grinding disc S, this disc is displaced forwardly by the amount a, the generating surface-defining lines for external and internal grinding will coincide, so that the profiles produced by the external and internal grinding will also completely coincide.

The displacement of the trueing up position for external grinding by the amount a has the further advantage, that the diamond holder 88 can be so formed that during external grinding it can, with the grinding disc S retracted, come between the latter and the work. It is thus possible to carry out the trueing up of the external grinding disc S without removing the work.

A further considerable advantage of the described trueing-up device is, that the diamond holder 88 which is rockable on an adjusting slide 91 together with the two diamonds 89 and 90, which in the swung-in position always lie in a plane which is parallel to the guide 80 for the slide 8 and passes through the axis 24 of the work, can by means of a fine thread spindle 92 be adjusted in the guide 93 of the adjusting slide 91, which is also parallel to the guide 80, with respect to the axis of the work in such a manner that, during internal grinding, the distance of the point of the diamond 89 from the axis 24 of the work exactly corresponds to the radius of the profile to be made, whilst, during external grinding, this distance is increased by the amount a, by which (as already described) the grinding disc S is displaced forwardly after the trueing up operation. During trueing up the grinding discs S and S' respectively are thus always brought against their diamond 90 or 89 respectively and the position reached after the end of the trueing up operation will then also during grinding give the profile diameter of the work, which is to be produced.

As the machine described can be used in the same way for external grinding or internal grinding, provision is made to permit the change over from external to internal grinding or vice versa to be carried out rapidly and without trouble. In view of the circumstance, that for external grinding the centre point 53 (Fig. 9a) in the spindle support 51 for the work must be stationary, the work spindle 94 is in both cases fixed rigidly in the spindle support 51, Figs. 9a and 9b. Rotatably journalled on the spindle 94 with a sufficient bearing distance is a sleeve 95 which is driven by the toothed wheel 96 (corresponding with wheel 39 in Fig. 3), the arrangement being such that the sleeve 95 can take at its end 95a either the driving disc 54 for external grinding or, for internal grinding, the chuck plate 55a with the chuck 55 or any other clamping device.

The clamping device (Figs. 9a, 9b) which is used is fixed by the divided clamping ring 97. This arrangement has the advantage, that the change from one clamping means to another can be effected without loss of time and the clamped work can be turned rapidly and accurately with respect to the sleeve 95, in order that a piece of work which has already been partially operated on can immediately be brought into the correct profile position.

As already stated the upper part 50 of the table is arranged so as to be capable of swivelling on the lower part 46 of the table, in order that not only cylindrical but conical work can be operated on. The arrangement is made such that the point of rotation for the swivelling of the upper part 50 of the table coincides with the axis of the driving shaft 37 (Figs. 3 and 4) for the workpiece W, which is perpendicular to the bearing surface of the table. In case the amount of swivel of the upper part 50 of the table should not be sufficient for the production of specially conical work, the work carrier 51 may be also arranged to turn about the same axis (shaft 37) on the upper part 50 of the table.

Hitherto a scale has been employed for adjusting the swivelling of the table, which however does not provide sufficient accuracy. It is therefore necessary, both when adjusting for conical work and when resetting to cylindrical, to continue to adjust by trial, until the desired position is obtained. This disadvantage is overcome in the present case through a measuring surface 50a being provided at the upper part 50 of the table, whilst on the lower part 46 of the table there is a corresponding measuring surface 46a (Figs. 7 and 8). The distance between these two measuring surfaces is adjusted by using suitable gauges, so that according to the size of the gauge employed, either the position for operating on a pure cylinder or the conicity required in any case can be adjusted rapidly and with the greatest accuracy.

Figure 10:
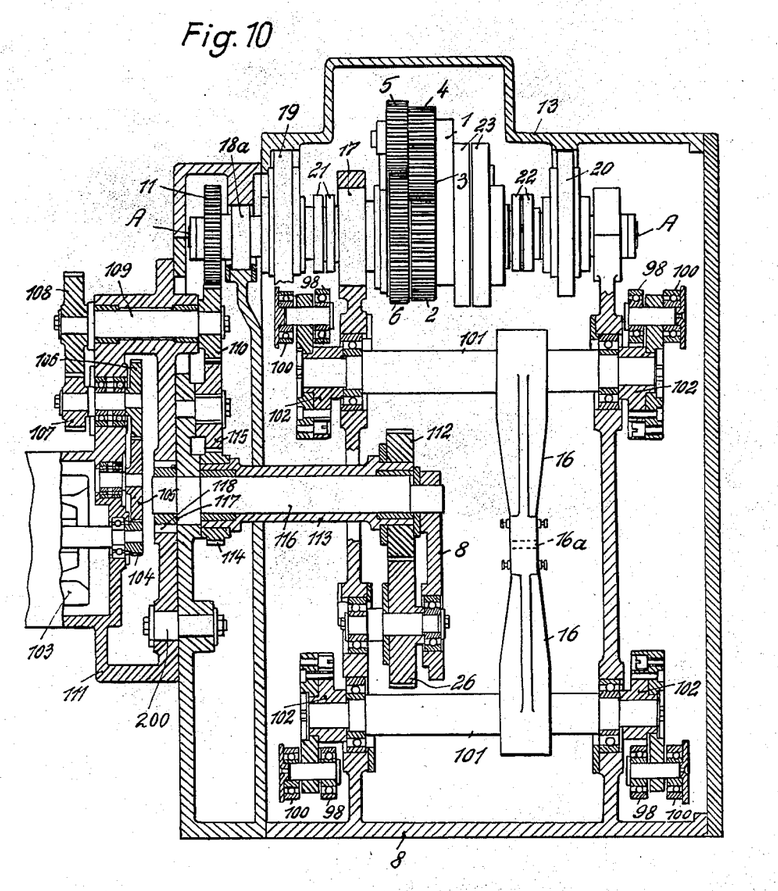
Figure 10 is a cross section through the upper part of the machine shown in Figure 8.
Figure 11:
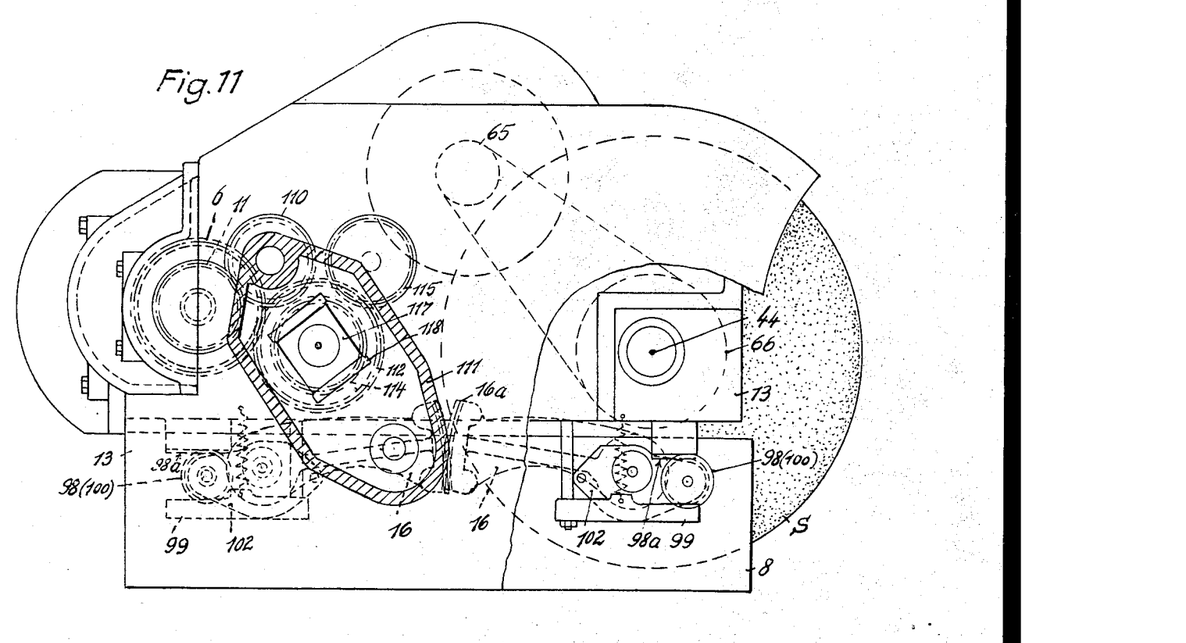
Figure 11 is a side elevation of the upper portion of the tool carrier and showing a section through the driving arrangement for the blank, when grinding profiles, and Figure 12 a section through the driving arrangement for the blank, when grinding ordinary round work.
Figure 12:
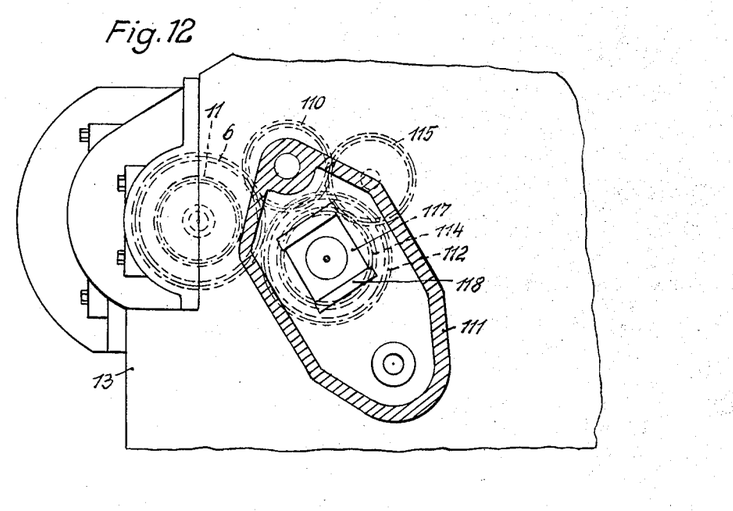

When grinding profiles the tool carrier 13 executes (as already described) an upwardly and downwardly swinging motion. This must take place in such a manner that all points of the bearing body 13 always move in the same paths, particular care being taken that the part 13 always retains the proper support, in order that it may be able during grinding completely to take up without vibration the forces which occur. In addition to the said swinging motion there is a slight motion in a direction parallel to the guide 80. In order that the tool support 13 may be able to execute these motions without friction and nevertheless have a sufficiently secure support, the part 13 rests with the rolling paths or slotted guides 98a (corresponding to 14, Fig. 3) provided at its four lower corners on four ball bearings 98 which are guided uniformly by means of the segment levers 16, 16a, the crank shafts 101 (corresponding to 15, Fig. 3) and the cranks 102 (Figs. 10 and 11). The result of this arrangement is, that in addition to there being a large bearing area, the grinding pressure will be taken up in such a manner that there will be absolutely no tilting moment. The bearing body 13 is secured from lifting by slotted guides 99 (Fig. 11) which however, in order completely to eliminate any sliding friction and to prevent any play, bear against ball bearings 100 which lie at the same level next to the ball bearings 98.

For driving the work, a motor 103 is used, which by way of the spur wheels 104, 105, 106, the exchangeable wheels 107 and 108, drives the shaft 109 with the spur wheel 110. From the spur wheel 110 the driving motion is transmitted to the gear 11 of the gear unit previously described with reference to Figs. 5 and 6, and thus to the work itself as well.

The above described machine may also be used for ordinary round grinding. For this purpose it is necessary for the motions produced by the shaft A and the gearing 1, 2, 4, 5, 6 (Figs. 1a, 1b and 1c) and transmitted to the tool, to be capable of being put out of operation. At the same time an equal transmission must be established from the driving motor 103 to the work. This change over is effected through the casing 111 being turned about the axle 200. The casing contains the driving motor 103 and the transmission wheels 104, 105, 106, 107, 108, and the shaft 109 and the wheel 110 being capable of being swung round and for the corresponding gear wheels being brought into and out of mesh by the amount of this swinging motion.

When grinding profiles the gear wheel 110 which is driven by the motor 103 drives the gear wheel 11 of the gear unit (shaft A) and from the latter in the manner already described the work piece W (Figs. 3 and 4). The gear wheel 112 lying in the train of wheels which drive gear 26 (Figs. 3 and 10) is rigidly connected to a sleeve 113, as is also the gear wheel 114 which in this case (Fig. 11) is out of mesh with the intermediate wheel 115. The sleeve 113 turns loosely on the shaft 116 which has an eccentric portion rotatable in a bearing in the carriage 8 and, at its free end, carries the sliding block 117 which, is guided in the slot 118 of the casing 111. On the shaft 116 being turned about the axis of its eccentric portion, in one direction, the sleeve 113 is swung away from gear 115, and in the opposite direction, the casing 111 is also swung out by means of the sliding block 117. By this means the wheels 110 and 11 and the wheels 114 and 115 are caused to come out of engagement, that is to say the gear unit (shaft A) and with it the bearing body 13 will now perform no motion of any kind, whereby the tool axis 44 will also remain stationary with respect to the work axis. Simultaneously with this swinging motion the wheel 114, sleeve 113 and the wheel 110 will be brought into engagement with the intermediate wheel 115, whereby the connection with the driving motor 103 is again established and the latter will impart its uniform motion to the new piece of work which is to be ground to a round shape. Through this described arrangement it is thus possible by means of a single manipulation to change over the machine from profile grinding to round grinding or vice versa.

As already described the gear wheel pump 71 intended for the delivery of the pressure oil and the centrifugal pump 72 serving for the conveyance of cooling water are driven by a common motor 70 (Fig. 7). The arrangement is made such that the cooling water is taken round the motor 70 which is totally enclosed and is thus protected against dirt and which is given a particularly effective cooling, even when continuously in operation.

The cooling water also serves the purpose of cooling both the bearings of the grinding spindle 62 (Fig. 9) and the motor 64 which serves for driving the grinding disc. The cooling water is first taken through the channels 119 (Fig. 7) surrounding the grinding spindle 62 and thence into the channels 120 extending around the motor 64. From there the cooling water passes through the stop cock 121 (Fig. 7) to the distributor 122 which during external grinding conveys the water to the external grinding disc S and also to a stop cock (not shown) which regulates the water supply during internal grinding. Both stop cocks are so constructed that in the closed state they supply the water to the outflow pipe 123, so that in this way a closed circulation of the cooling water is always ensured. This provides the advantage, that, even should the cooling water be shut off during the grinding operation, there will be a constant cooling of the motors 64 and 70 and of the grinding wheel spindle 62.

What I claim is:

1. In a machine of the character described, work piece supporting means adapted to support and turn a work piece about a relatively fixed axis, second supporting means arranged adjacent the work piece supporting means, a carriage supported by the second supporting means, a tool carrier supported by the carriage and provided with a rotatable tool adapted to act on a work piece supported by the work piece supporting means, power transmitting means supported by the carriage including a rotatable shaft, means operatively connecting the shaft to the tool carrier for raising and lowering the latter and for shifting the tool carrier toward and away from the axis of the work piece holder, whereby the tool is moved relatively to the last mentioned axis in conformity with the movements of the tool carrier, the last mentioned means including rectilinear guides movable with the tool carrier, and linkage means movable with the shaft and having parts extending into said guides.

2. In a machine of the character described, work piece supporting means adapted to support and turn a work piece about a relatively fixed axis, second supporting means arranged adjacent to the work piece supporting means, a carriage supported by the second supporting means, a tool carrier supported by the carriage and provided with a rotatable tool adapted to act on a work piece supported by the work piece supporting means, power transmitting means supported by the carriage and comprising a rotatable shaft, and means operatively connecting the shaft to the tool carrier for raising and lowering the latter and for shifting the tool carrier toward and away from the axis of the work piece holder, whereby the tool is moved relatively to the last mentioned axis in conformity with the movements of the tool carrier, the last mentioned means including first and second rectilinear guides movable with the tool carrier, first elements movable with the shaft and having portions slidable in the first guides, second elements in which the shaft rotates and having parts slidable in the second guides, and link means connecting the first elements to a fixed axle supported by the tool carrier.

3. In a machine of the character described, work piece supporting means adapted to support and turn a work piece about a relatively fixed axis, second supporting means arranged adjacent to the work piece supporting means, a carriage supported by the second supporting means, a tool carrier supported by the carriage and provided with a rotatable tool adapted to act on a work piece supported by the work piece supporting means, power transmitting means supported by the carriage and comprising a rotatable shaft, means operatively connecting the shaft to the tool carrier for raising and lowering the latter and for shifting the tool carrier toward and away from the axis of the work piece holder, whereby the tool is moved relatively to the last mentioned axis in conformity with the movements of the tool carrier, pairs of levers pivotally mounted intermediate their ends on the carriage and having their outer ends slidably engaging the tool carrier, and toothed segments arranged at the inner ends of the levers and meshing with one another.

4. In a machine of the character described, work piece supporting means adapted to support and turn a work piece about a relatively fixed axis, second supporting means arranged adjacent the work piece supporting means, a carriage supported by the second supporting means, a tool carrier supported by the carriage and provided with a rotatable tool adapted to act on the work piece supported by the work piece supporting means, power transmitting means supported by the carriage including a rotatable shaft, means operatively connecting the shaft to the tool carrier for raising and lowering the latter and for shifting the tool carrier toward and away from the axis of the work piece holder whereby the tool is moved relatively to the last mentioned axis in conformity with the movements of the tool carrier, a supporting member, a table supported by the supporting member and supporting the work piece holder, guiding means for the table comprising guide surfaces on the supporting member which are parallel to one another and inclined with respect to the horizontal, a third guide surface on the supporting member engaged by the table and arranged at an angle with respect to said parallel guide surfaces, said parallel surfaces being so inclined as to permit the tool holder to gravitate away from the tool, and the table having a portion engaging the third guide surface to limit such gravitational movement.

5. In a machine of the character described, work piece supporting means adapted to support and turn a work piece about a relatively fixed axis, second supporting means arranged adjacent the work piece supporting means, a carriage supported by the second supporting means, a tool carrier supported by the carriage and provided with a rotatable tool adapted to act on the work piece supported by the work piece supporting means, power transmitting means supported by the carriage including a rotatable shaft, means operatively connecting the shaft to the tool carrier for raising and lowering the latter and for shifting the tool carrier toward and away from the axis of the work piece holder whereby the tool is moved relatively to the last mentioned axis in conformity with the movements of the tool carrier, guides on said supporting means for the carriage, and said guides being inclined to the horizontal in such a manner that the carriage tends to slide toward the work piece to be operated on whereby the relative position of the tool and the work is always definitely determined.

6. In a machine of the character described, work piece supporting means adapted to support and turn a work piece about a relatively fixed axis, second supporting means arranged adjacent the work piece supporting means, a carriage supported by the second supporting means, a tool carrier supported by the carriage and provided with a rotatable tool adapted to act on the work piece supported by the work piece supporting means, power transmitting means supported by the carriage including a rotatable shaft, means operatively connecting the shaft to the tool carrier for raising and lowering the latter and for shifting the tool carrier toward and away from the axis of the work piece holder whereby the tool is moved relatively to the last mentioned axis in conformity with the movements of the tool carrier, said carriage being movable toward and away from the tool holder, a screw fixed to the carriage and extending parallel to its path of movement, a nut engaging the screw and provided with a piston, a second smaller piston secured to the screw, a differential cylinder in which the pistons operate, and means controlled by turning said nut.

7. In a machine of the character described, work piece supporting means adapted to support and turn a work piece about a relatively fixed axis, second supporting means arranged adjacent the work piece supporting means, a carriage supported by the second supporting means, a tool carrier supported by the carriage and provided with a rotatable tool adapted to act on the work piece supported by the work piece supporting means, power transmitting means supported by the carriage including a rotatable shaft, means operatively connecting the shaft to the tool carrier for raising and lowering the latter and for shifting the tool carrier toward and away from the axis of the work piece holder whereby the tool is moved relatively to the last mentioned axis in conformity with the movements of the tool carrier, a supporting member, a table mounted on the supporting member and supporting the work piece holder, and oppositely disposed measuring surfaces arranged respectively on the supporting member and table whereby the distance between the two measuring surfaces may be adjusted.

8. In a machine of the character described, work piece supporting means adapted to support and turn a work piece about a relatively fixed axis, second supporting means arranged adjacent the work piece supporting means, a carriage supported by the second supporting means, a tool carrier supported by the carriage and provided with a rotatable tool adapted to act on the work piece supported by the work piece supporting means, power transmitting means supported by the carriage including a rotatable shaft, means operatively connecting the shaft to the tool carrier for raising and lowering the latter and for shifting the tool carrier toward and away from the axis of the work piece holder, including pivotally connected links forming a parallelogram rotatably mounted at one corner on said shaft, and means carried by the links slidably engaging the carriage whereby the tool is moved relative to the axis of the workpiece in accordance with the movements of the tool carrier.

RICHARD MOSSDORF.